(12) United States Patent
Kawamura et al.

(10) Patent No.: US 10,241,282 B2
(45) Date of Patent: Mar. 26, 2019

(54) OPTICAL TRANSCEIVER WITH FIBER TRAY SECURING INNER FIBER

(71) Applicant: Sumitomo Electric Industries, Ltd., Osaka-shi (JP)

(72) Inventors: Hiroshi Kawamura, Yokohama (JP); Kuniyuki Ishii, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/443,786

(22) Filed: Feb. 27, 2017

(65) Prior Publication Data

US 2017/0248763 A1    Aug. 31, 2017

(30) Foreign Application Priority Data

Feb. 29, 2016    (JP) ................. 2016-037806

(51) Int. Cl.
*G02B 6/42*    (2006.01)
*H04B 10/40*    (2013.01)

(52) U.S. Cl.
CPC ............. *G02B 6/421* (2013.01); *G02B 6/424* (2013.01); *G02B 6/425* (2013.01); *G02B 6/4206* (2013.01); *G02B 6/428* (2013.01); *G02B 6/4245* (2013.01); *G02B 6/4246* (2013.01); *G02B 6/4292* (2013.01); *G02B 6/4295* (2013.01); *H04B 10/40* (2013.01)

(58) Field of Classification Search
CPC ...... G02B 6/421; G02B 6/425; G02B 6/4245; G02B 6/4206; G02B 6/424; G02B 6/4295; G02B 6/4292; G02B 6/4246; G02B 6/428; H04L 5/14; H04B 10/40
See application file for complete search history.

(56) References Cited

U.S. PATENT DOCUMENTS

| 2010/0322583 | A1* | 12/2010 | Cooke | G02B 6/4452 385/135 |
| 2012/0237171 | A1* | 9/2012 | Oki | G02B 6/4201 385/78 |
| 2016/0095211 | A1* | 3/2016 | Goto | H05K 1/0274 398/135 |
| 2016/0223763 | A1* | 8/2016 | Benner | G02B 6/3829 |
| 2017/0097484 | A1* | 4/2017 | Teo | G02B 6/4277 |

FOREIGN PATENT DOCUMENTS

JP    2008-090232 A    4/2008

* cited by examiner

*Primary Examiner* — Leslie C Pascal
(74) *Attorney, Agent, or Firm* — Baker Botts L.L.P.; Michael A. Sartori

(57) ABSTRACT

An optical transceiver performing the full-duplex transmission in a plural channel is disclosed. The optical transceiver provides an optical receptacle, a semiconductor optical device, an inner fiber that optically couples the optical receptacle with the semiconductor optical device, and a fiber tray that secures an extra length of the inner fiber. The fiber tray provides an inner wall inclined toward a direction perpendicular to a direction along which the inner fiber warps. The inner fiber is set within the space as touching the inclined inner wall and sliding thereon toward the inclined direction.

9 Claims, 10 Drawing Sheets

OPTICAL TRANSCEIVER WITH FIBER TRAY SECURING INNER FIBER

BACKGROUND OF THE INVENTION

1. Field of the Invention

The present invention relates to an optical transceiver, in particular, the invention relates to an optical transceiver having inner fibers that optically couple an external optical connector with optical devices implemented within the optical transceiver.

2. Background Arts

One type of optical apparatus is generally called as an optical transceiver that concurrently implements functions of an optical transmission and an optical reception. An optical transceiver installs a semiconductor laser diode for a light source of the optical transmission and a semiconductor photodiode for a transducer of the optical reception. When an optical transceiver implements as the light source a laser diode of the type of vertical cavity surface emitting laser diode (VCSEL), a function to bend an optical axis of the light source by a right angle becomes inevitable. That is, a VCSEL is mounted on a circuit board, while, an external connector set within an optical receptacle of the optical transceiver has an optical axis perpendicular to the circuit board. Accordingly, the light coming from the VCSEL is necessary to be bent by a right angle to optically couple with the external optical connector. One or more inner fibers may optically couple the optical device with the optical connector, refer to a Japanese Patent Application laid open No. 2008-090232.

The inner fibers coupling optical component inevitably have surplus lengths to absorb dimensional tolerances of the optical components and reduce optical losses due to stresses applied thereto. Treatments of the surplus lengths in the inner fibers become substantial in the mechanical design of an optical transceiver. The optical transceiver disclosed in the prior patent document above connect a lens assembly, to which optical fibers are coupled, with a circuit board by a flexible printed circuit (FPC) board to absorb dimensional tolerances of the components. However, FPC boards as additional parts raise assembling costs of the optical transceiver.

SUMMARY OF THE INVENTION

An aspect of the present application relates to an optical transceiver that performs a full-duplex communication between transmitting channels and receiving channels. The optical transceiver comprises an optical receptacle, a multiple-fiber push on (MPO) connector, a transducer, a fiber bundle, a fiber tray, and a circuit board. The optical receptacle receives an external optical connector. The MPO connector, which is secured within the optical receptacle, optically couples with the external connector. The transducer includes a laser diode (LD) chip that provides LD elements and a photodiode (PD) chip that provides PD elements. The fiber bundle includes inner fibers that optically couple the MPO connector with the LD chip and the PD chip, where the fiber bundle has an extra length longer than a distance between the optical receptacle and the transducer. The fiber tray secures the fiber bundle therein. The circuit board, which has a primary surface, mounts the LD chip, the PD chip and the fiber tray on the primary surface thereof. A feature of the optical transceiver of the present application is that the fiber tray is mounted on the circuit board between the transducer and the optical receptacle, and the fiber bundle is warped along a direction connecting the transducer and the optical receptacle in the fiber tray.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENT

Next, embodiment of the present invention will be described as referring to drawings. The present invention is not restricted to the embodiment but may include all modifications and changes thereof within a scope of claims and equivalents thereof. Also, in the explanations of the drawings, numerals or symbols same with or similar to each other will refer to elements same with or similar to each other without duplicating explanations.

Figure 1:
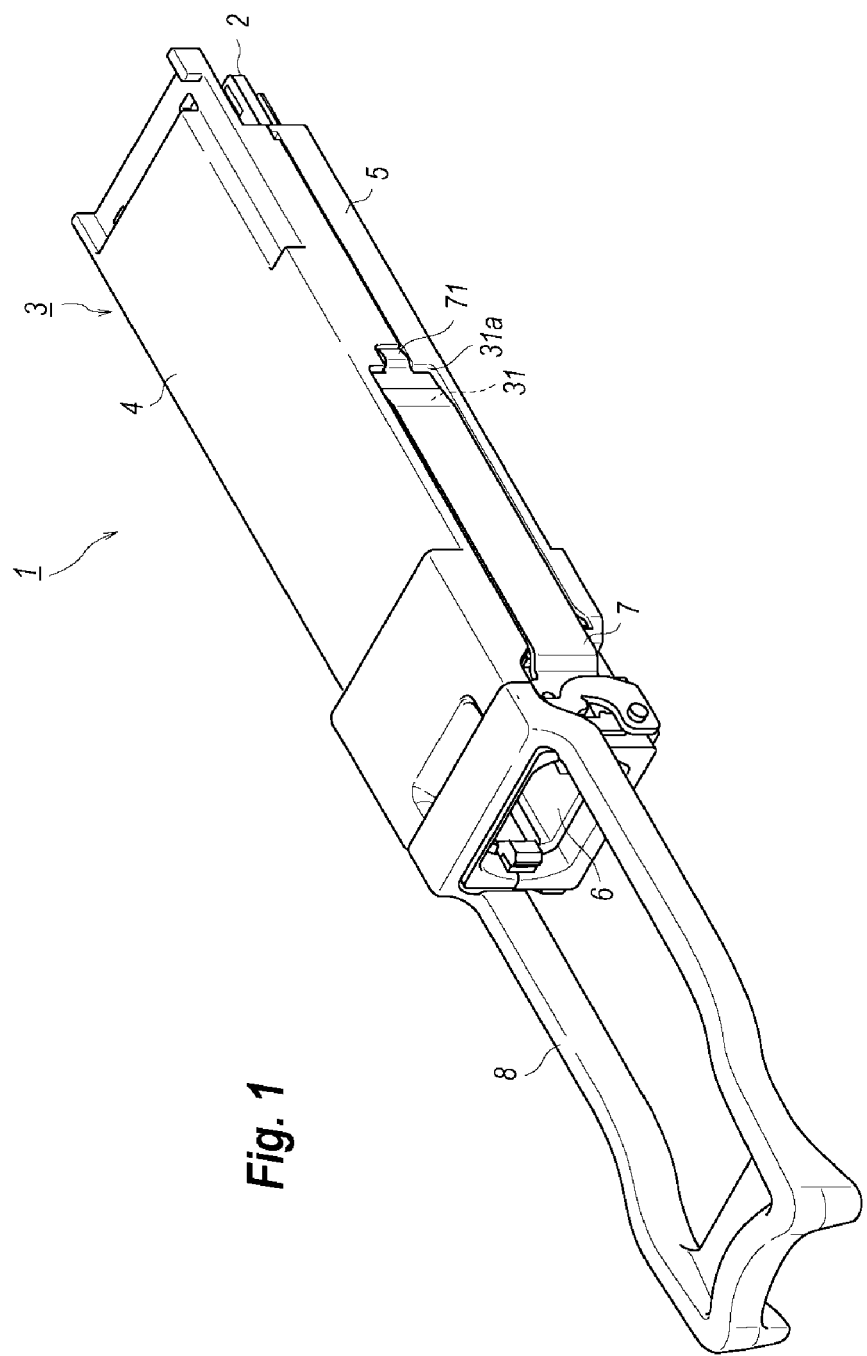
FIG. 1 is an outer appearance of an optical transceiver according to embodiment of the present invention.

FIG. 1 is an outer appearance of an optical transceiver according to the present invention, where the optical transceiver 1 follows one of multi-source agreements (MSAs) of, what is called as the Quadrature Small Form Factor Pluggable (QSFP). The optical transceiver 1 may be pluggably installed on a host system and implement functions of the optical transmission and the optical reception concurrently. The optical transceiver 1 provides four channels in the optical transmission and another four channels in the optical reception, where respective channels have performance of a speed of, for instance, 10 Gbps or 25 Gbps. Accordingly, the optical transceiver 1 may be operable in communication capacity reaching 10 Gbps×4=40 Gbps or 25 Gbps×4=100 Gbps. The optical transceiver of the present invention directs the application thereof to the communication within a data center whose transmission lengths are limited to be a few hundred meters to a few kirometers.

The optical transceiver 1 provides a housing 3 that encloses a circuit board 2 therein. Specifically, the housing 3 of the optical transceiver 1 may be constituted from a top housing 4 and a bottom housing 5 that form a space to enclose the circuit board 2, where the circuit board 2 is mounted on the bottom housing 5. The top and bottom housings may be formed by die-casting of aluminum (Al) and/or zinc alloy (Zn) in the present embodiment, but the top and bottom housings may be made of resin with a metal coat on surfaces thereof to enhance performance of the EMI shielding.

The optical transceiver 1 further provides an MPO (Multiple fiber Push-On) connector 6 in one of ends thereof, where the MPO connector 6 receives an external optical connector therein. In the explanation below, a direction of 'forward' and/or 'front' corresponds to a side where the MPO connector 6 is provided, while, another direction of 'rear' and/or 'back' is a side where an electrical plug 2 is provided. However, those directions are assumed merely for the explanation sake, and a scope of the invention may be not affected by those assumptions. The optical transceiver 1 may further provide sliders 7 in respective sides and a pull-tab 8 combined with the sliders 7. The slider 7 may longitudinally slide along a direction connecting the front side to the rear side as pulling or pushing the pull-tab 8.

The sliders 7 in respective rear ends provide projections 71 projected from the sides of the housing 3. The sliders 7 are bent inward at rear portions thereof adjacent to the projections 71. Inserting the optical transceiver 1 into a cage prepared in the host system, the sliders 7 in the respective ends may be set within hollows 3 in the side walls of the housing 3. When the optical transceiver 1 is set within in the cage, a tab in the cage is butted against the rear wall 31a of the hollow 31, which prevents the optical transceiver 1 from slipping out from the cage. Sliding the pull-tab 8 frontward under such a status of the optical transceiver 1 in the cage, which extrudes the end portions of the slider 7 to push the projections 71 outwardly, the tab in the cage butted against the rear wall 31a may be released therefrom; then, the optical transceiver 1 may be extracted from the cage.

Figure 2:
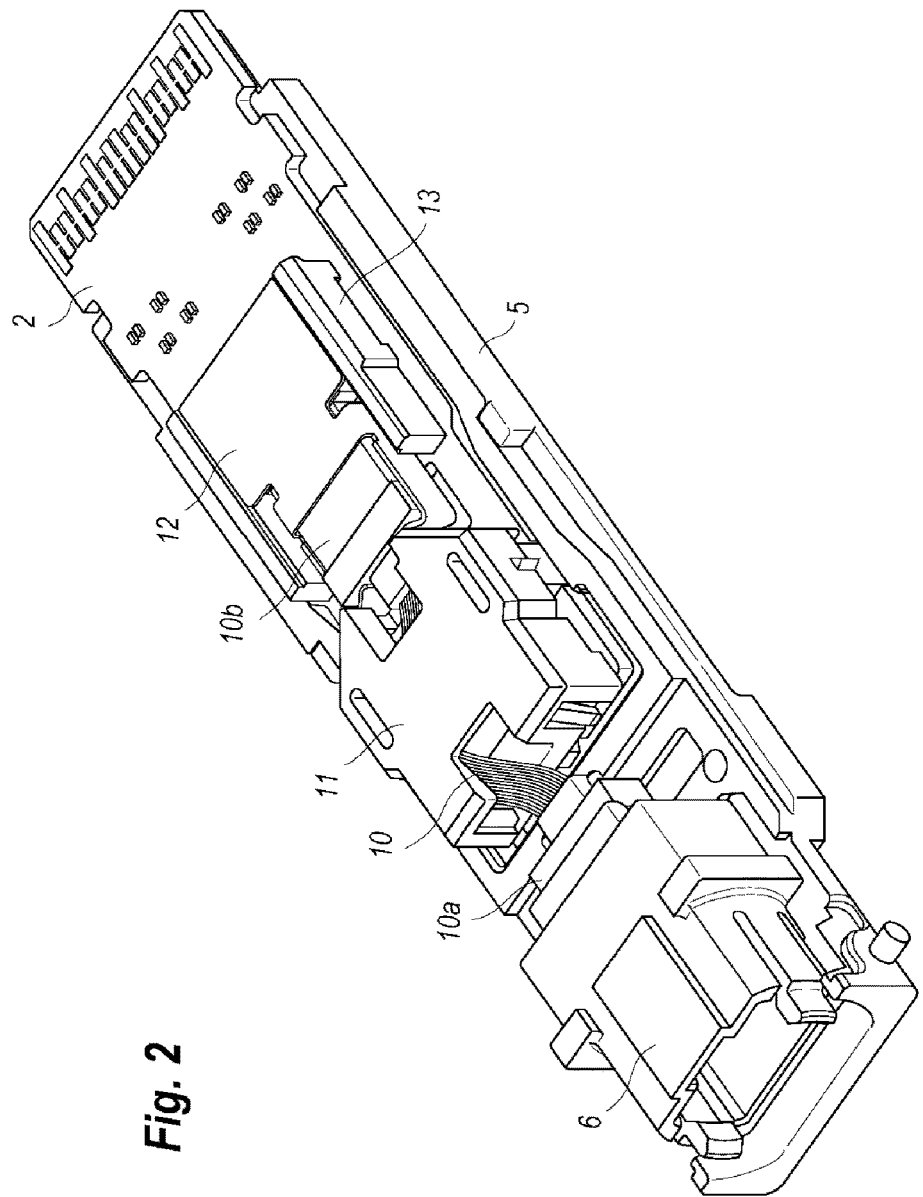
FIG. 2 shows an inside of the optical transceiver illustrated in FIG. 1.
Figure 3:
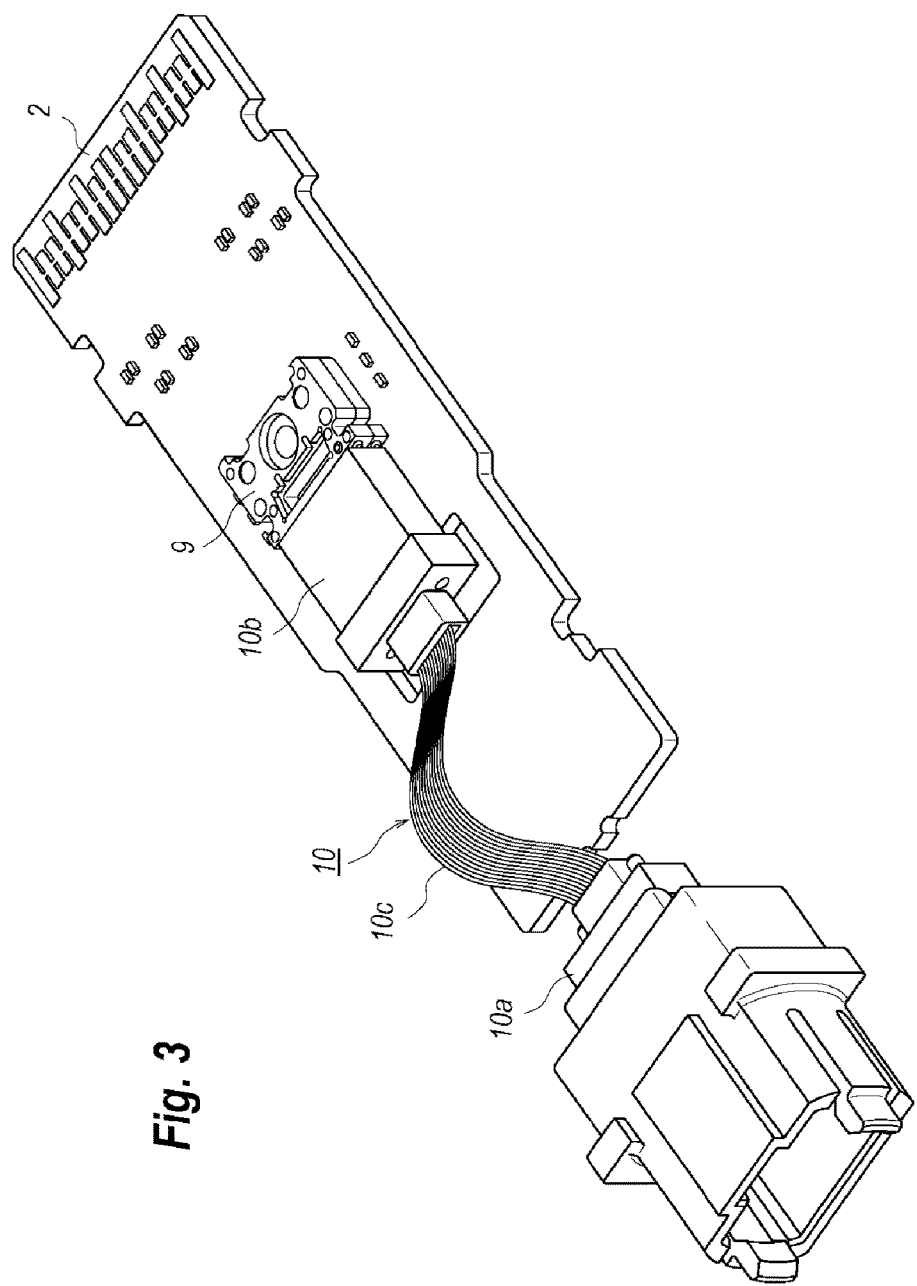
FIG. 3 also shows an inside of the optical transceiver shown in FIG. 1.

FIGS. 2 and 3 are perspective views showing an inside of the optical transceiver 1, where FIG. 2 removes the pull-tab 8, the slider 7, and the top housing 4, while, FIG. 3 further removes the bottom housing 5, a fiber tray 11, a clip 12 and a support 13, where the fiber tray 11, the clip 12, and the support 13 will be described later. The optical transceiver 1 encloses those components of a coupling part 9, an inner fiber bundle 10, a fiber tray 11, the clip 12 and the support 13, in addition to the MPO connector 6 and the circuit board 2, in the space formed between the top housing 4 and the bottom housing 5.

In the optical transceiver 1, the circuit board 2 mounts semiconductor optical devices thereon as setting optical axes thereof perpendicular to a primary surface of the circuit board 2. On the other hand, the optical axis of the MPO connector 6, exactly, the optical axis of an MT (Mechanically Transferable) ferrule set within the MPO connector 6, extends in parallel to the primary surface of the circuit board 2. That is, the optical axis of the semiconductor optical device on the circuit board 2 makes an angle of 90° against the optical axis of the MT ferrule. The coupling part 9 provided in the optical transceiver 1 may align these optical axes. The coupling part 9 may mounted on the circuit board 2 as being surrounded and supported by the support 13.

The fiber bundle 10 that includes inner fibers 10c optically couples the MT ferrule in the MPO connector 6 with the coupling part 9. The fiber bundle 10, as shown in FIG. 3, provides the inner fibers 10c arranged in an array and coupled with the MT connectors, 10a and 10b, in respective ends. The inner fibers 10c in the present embodiment are independent to each other with respective extra lengths compared with a distance between the MT connector 10a in the MPO connector 6 and the coupling part 9. Thus, such inner fibers 10c may absorb the positional tolerances or the dimensional tolerances between the MT connectors, 10a and 10b.

The fiber tray 11, which is set between the MPO connector 6 and the coupling part 9 and mounted on the circuit board 2, may receive the extra lengths of the inner fiber 10c. One feature of the optical transceiver 1 of the present embodiment is that the fiber tray 11, which is a part merely to arrange the inner fibers 10c, has dimensions, in particular a lateral width thereof, substantially equal to those of the MPO connector 6 and/or the coupling part 9. In other words, the circuit board 2 mounts the fiber tray 11 whose cross section and footprint are comparable to a cross section of the housing 3 and an area of the circuit board 2, respectively.

The support 13, which sets the coupling part 9 in a designed position on the circuit board 2, has a plane shape of a C-character with an inner space surrounded by respective bars in the C-character secures the coupling part 9 therein. The support 13 is also fixed to the circuit board 2. The clip 12 may fix the coupling part 9 with the circuit board 2 co-operating with the support 13 and secure the MT connector 10b with the coupling part 9.

Figure 4:
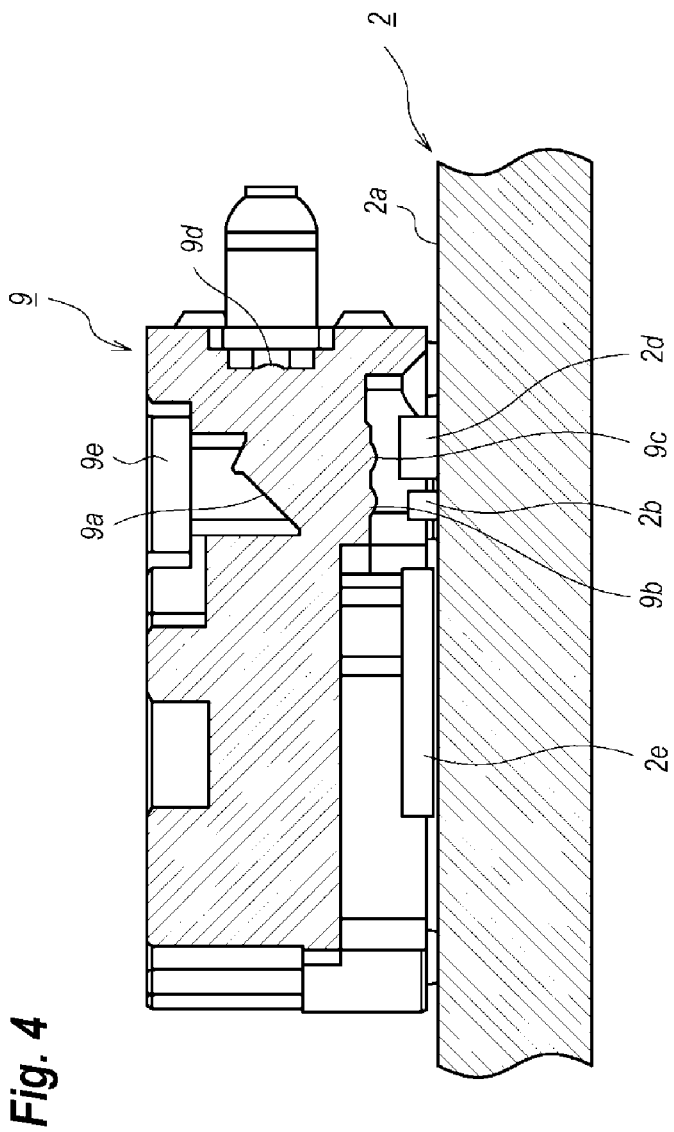
FIG. 4 shows a cross section of a coupling part assembled with a circuit board.

FIG. 4 is a cross section of the coupling part 9 mounted on the circuit board 2. The circuit board 2 in the primary surface 2a thereof mounts an LD chip 2b that integrates LD elements arranged in an array. The LD elements in the present embodiment have a type of the vertical cavity surface emitting LD (VCSEL) that emits an LD light toward a direction perpendicular to the primary surface 2a of the circuit board 2. The circuit board 2 also mounts a PD chip 2c that integrates PD elements arranged in an array. The PD chip 2c is placed behind the LD chip 2b in FIG. 4 and will be shown in FIG. 6. The PD elements, which may receive optical signals coming from the MPO connector 6 through the inner fibers 10c, are arranged in an array along the lateral direction same with those of the LD elements. The circuit board 2 further mounts a monitor PD (mPD) 2d in the primary surface 2a thereof. The mPD 2d also integrates PD elements laterally arranged as those of the LD elements and the PD elements. The PD elements in the mPD 2d may sense optical signals output from the LD elements. Accordingly, the mPD 2d is mounted on the circuit board 2 such that the PD elements in the mPD 2d are substantially in parallel to the LD elements.

The circuit board 2 in the primary surface 2a thereof also mounts electronic components such as a laser driver 2e integrating driver elements each driving the LD elements independently and a pre-amplifier 2f also integrating amplifier elements that amplifying signals output from the PD elements in the PD chip 2c. Those electronic devices, 2e and 2f, are preferably set as close as possible to the LD chip 2b and the PD chip 2c, because distances between the optical devices, 2b and 2c, and the electronic devices, 2e and 2f, strongly affects quality of electrical signals, in particular, when the electrical signals contain extremely high frequency components exceeding several giga-hertz.

The coupling part 9, which covers the optical semiconductor devices including the LD chip 2b and the PD chip 2c, is fixed with the circuit board 2. The coupling part 9 provides a reflecting surface 9a whose normal makes an angle of 45° with respect to the primary surface 2a of the circuit board 2. The coupling part 9 also provides lenses, 9b to 9d, for converting dispersing light output from the LD elements into collimating light or collimating light into concentrating light for the PD elements. The coupling part 9 further assembles a mirror 9e that reflects light output from the LD elements and transmitting through the reflecting surface 9a. The coupling part 9 may be made of mold resin.

As described above, the light output from the LD chip 2b is converted into collimated beams by the lenses 9b, reflected by the reflecting surface 9a to bend the optical axis thereof by a right angle, directed forward, and concentrated onto ends of the inner fibers held in the MT connector 10b by the forward lenses 9d. Although not illustrated in figures, the reflecting surface 9a provides blips or ribs with a triangular cross section. A portion of the light collimated by the lenses 9b entering the blip in the reflecting surface 9a transmits therethrough and advances toward to mirror 9e and reflected thereby. The portion of the light reflected by the mirror 9e advances toward the circuit board 2 and finally concentrated on the mPD 2d by the lenses 9c. Thus, the blip formed in the reflecting surface 9a enables the mPD 2d mounted on the primary surface 2a to sense the power of the light output from the LD chip 2b.

The light coming from the external optical connector set within the MPO connector 6 enters the coupling part 9 from the front end thereof propagating through the inner fibers 10c. The light entering the coupling part 9 is converted into the collimating beams by the lenses 9d, reflected by the reflecting surface 9a to be bent the optical axes thereof by 90°, and finally concentrated onto the PD elements of the PD chip 2c.

Figure 5:
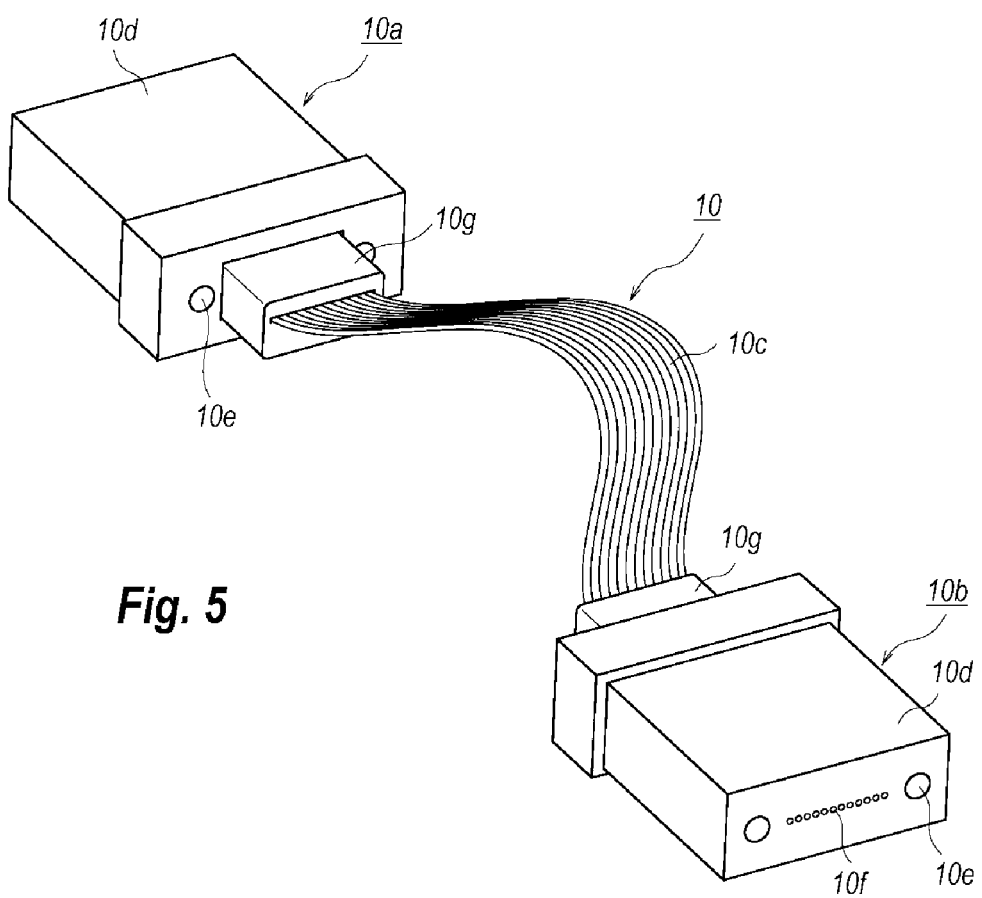
FIG. 5 is a perspective view of inner fibers.

FIG. 5 is a perspective view of the fiber bundle 10 with the MT connectors, 10a and 10b, attached secured in the respective ends of the fiber bundle 10. The fiber bundle 10 in the present embodiment includes twelve (12) inner fibers 10c whose respective ends are terminated by the MT connectors, 10a and 10b. The MT connectors, 10a and 10b, provide MT ferrules 10d that expose tips 10f of the inner fiber 10c in one end surfaces thereof. The end surfaces of the MT ferrules 10d also provide guide holes 10e in respective sides of the exposed tips 10f of the inner fibers 10c. Other end surfaces of the MT ferrules 10d further provide boots 10g that protect the inner fibers 10c in portions held by the MT ferrules 10d.

As already described, the optical transceiver 1 of the present embodiment has a function to transmit four (4) signals independent to each other and to receive four signals also independent to each other, which means that the optical transceiver 1 implements four light-transmitting devices and four light-receiving devices. In order to realize the full-duplex configuration, the optical transceiver 1 inevitably implements eight (8) inner fibers 10c. However, the optical transceiver 1 practically installs twelve (12) inner fibers 10c as described above, among which four inner fibers 10c arranged in respective sides of the fiber bundle 10 carry the optical signals. Rest four inner fibers 10c arranged in the center of the fiber bundle 10 do not carry any optical signals. This is because of reducing the cost of the optical transceiver. That is, a fiber bundle including twelve fibers is generally available in the field, and the adoption of an easily available component results in the reduction of the cost. The inner fibers 10c have lengths enough to connect the MT connectors, 10a and 10b, so as to cause no stress but so as not to form loops.

Figure 6:
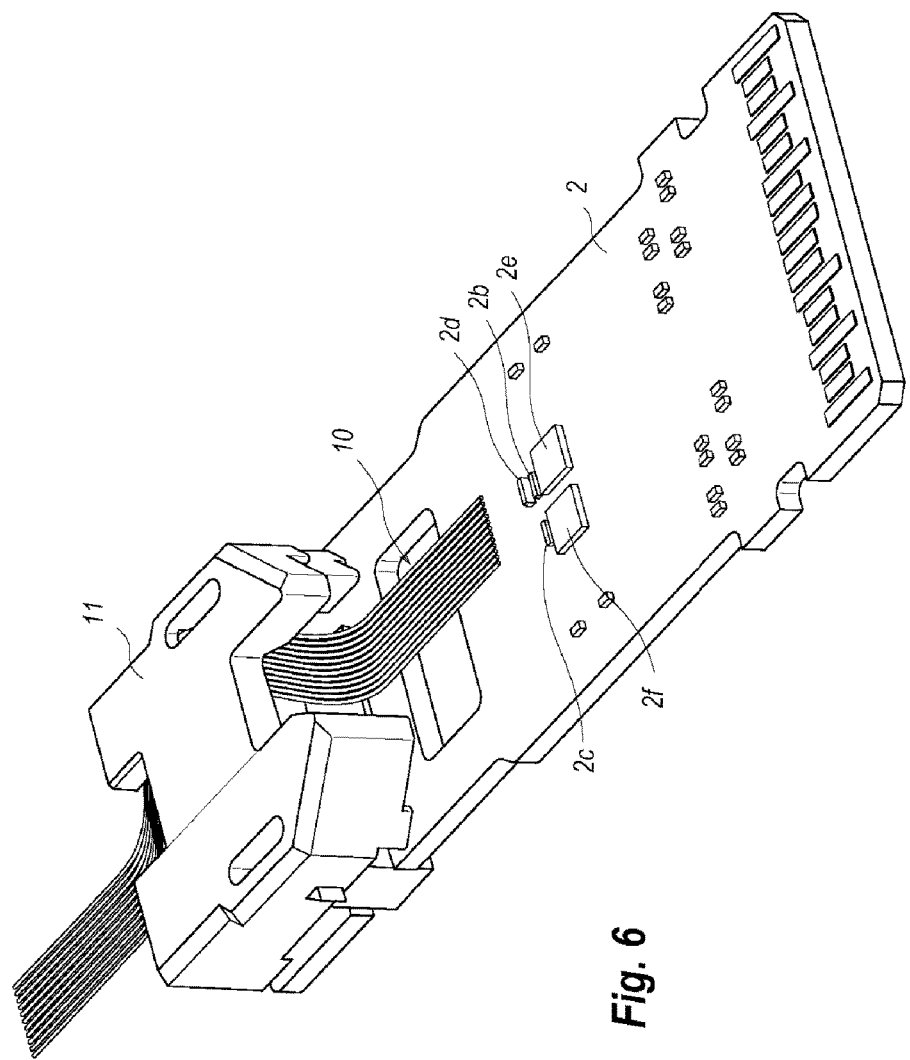
FIG. 6 is a perspective view of a circuit board.

FIG. 6 is a perspective view of the fiber tray 11 securing the fiber bundle 10, where the fiber tray 11 is mounted on the circuit board 2. The circuit board 2 also mounts the LD chip 2b, the PD chip 2c, the mPD 2d, electronic components of the LD driver 2e, the pre-amplifier 2f, and so on. The fiber tray 11 secures extra portions of the inner fibers 10c, and the fiber tray 11 in arrangements thereof is a feature of the present invention.

Figure 7A:
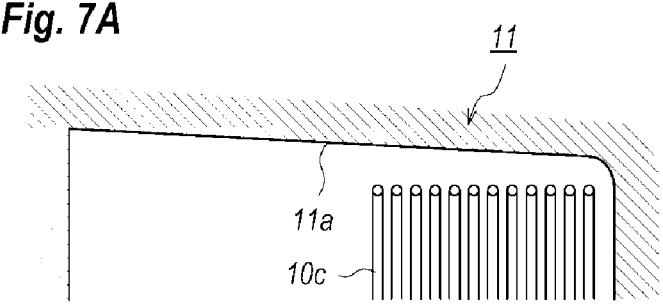
FIGS. 7A and 7B show a fiber tray.
Figure 7B:
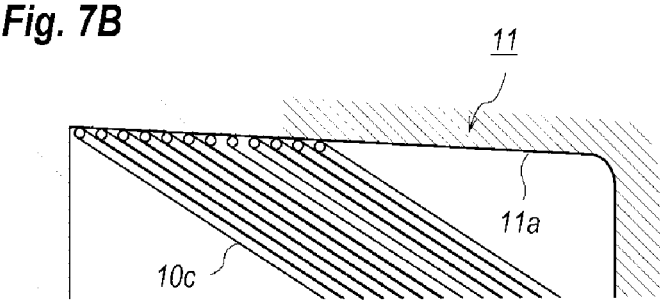
Figure 8A:
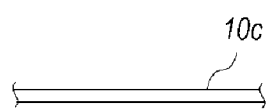
FIGS. 8A to 8D show a mechanism to secure inner fibers by the fiber tray.
Figure 8B:
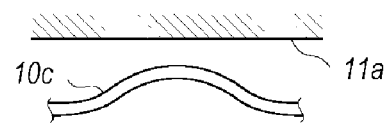
Figure 8C:
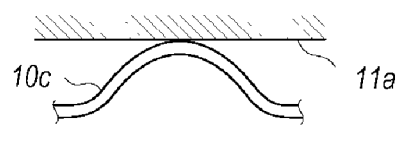
Figure 8D:
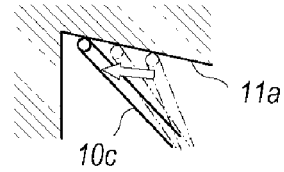

FIGS. from 7A to 8D show arrangements of the inner fibers 10c set within the fiber tray 11, where FIGS. 7A and 7B show the arrangement thereof viewed from the front, while, FIG. 8A shows the arrangement where the inner fibers 10c are free from the fiber tray 11, FIGS. 8B and 8C show the arrangements thereof viewed from the side, and FIG. 8D show the arrangements viewed from the front.

The inner fibers 10c, as illustrated in FIG. 8A, may have extend straight before they are implemented within the optical transceiver 1. When the inner fibers 10c has relatively shorter lengths, which are longer than the distance between the MPO connector 6 and the coupling part 9 so as to leave extra lengths; the inner fibers 10 do not touch the ceiling 11a of the fiber tray 11 as shown in FIGS. 7A and 8B, even when they are set within the fiber tray 11.

However, when the inner fibers 10c have enough extra lengths, the inner fibers 10c touch the ceiling 11a as shown in FIG. 8C after the fiber tray 11 is mounted on the circuit board 2. Because the ceiling 11a in the inner surface thereof is inclined toward the side, the inner fibers 10c touching the ceiling 11a may slide on the inclined ceiling toward the side without causing any stresses as the fiber tray 11 is fixed to the circuit board 2 as shown in FIG. 8D.

The fiber tray 11 of the present invention thus described easily secures the inner fiber 10c diagonally therein as shown in FIG. 7B even when the inner fibers 10c have longer extra lengths. The inclined ceiling 11a described above is a surface guiding the inner fibers 10c along the lateral direction of the optical transceiver 1. In an example, the inclined ceiling 11a makes a substantial angle against the primary surface 2a of the circuit board 2; that is, the inclined ceiling 11a extends unparallel with respect to the circuit board 2 in the lateral direction of the optical transceiver 1. The inclined ceiling 11a also makes a substantial angle against the inner surface of the top housing 4.

Figure 9A:
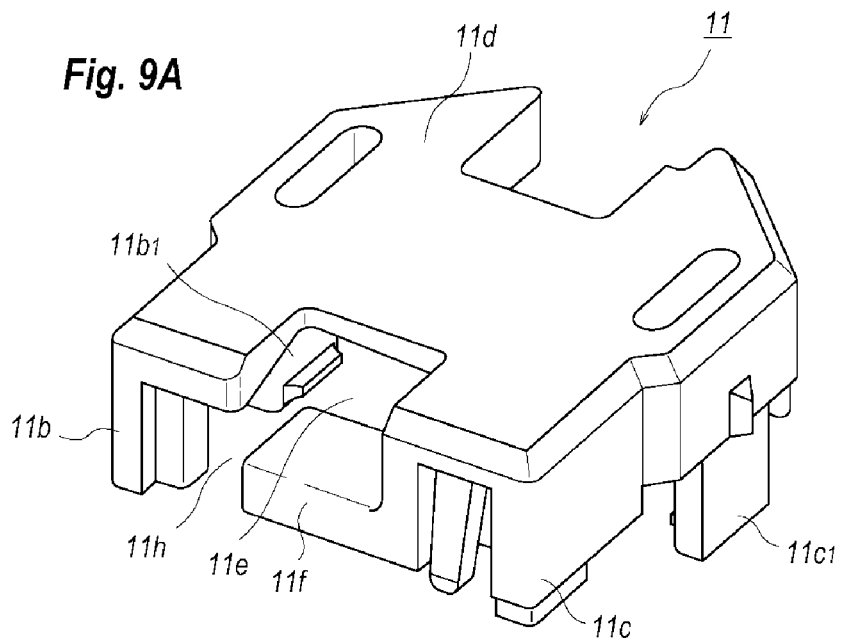
FIGS. 9A and 9B show a fiber tray viewed from a front and a back thereof, respectively.
Figure 9B:
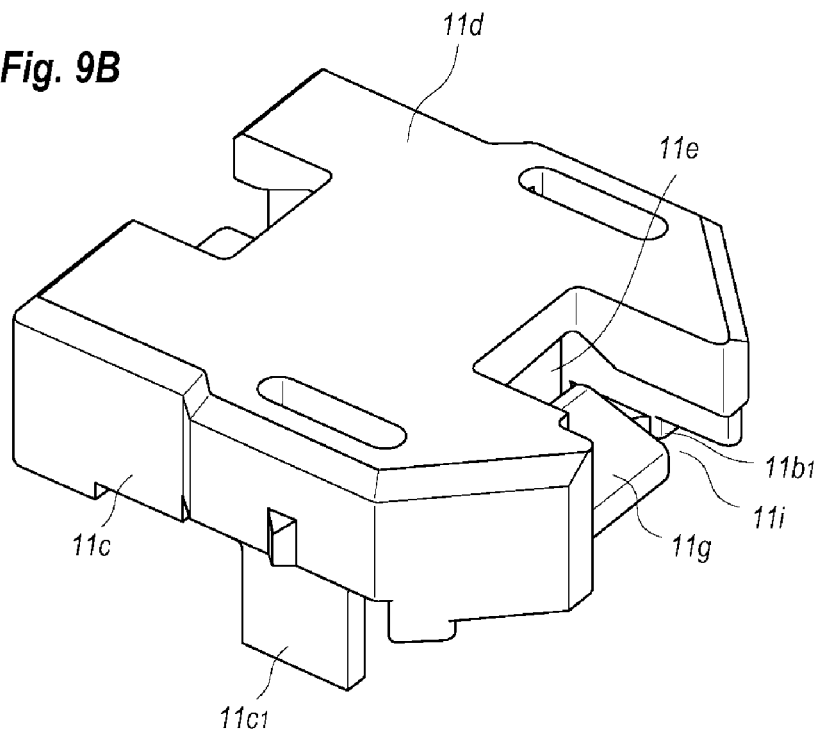
Figure 10A:
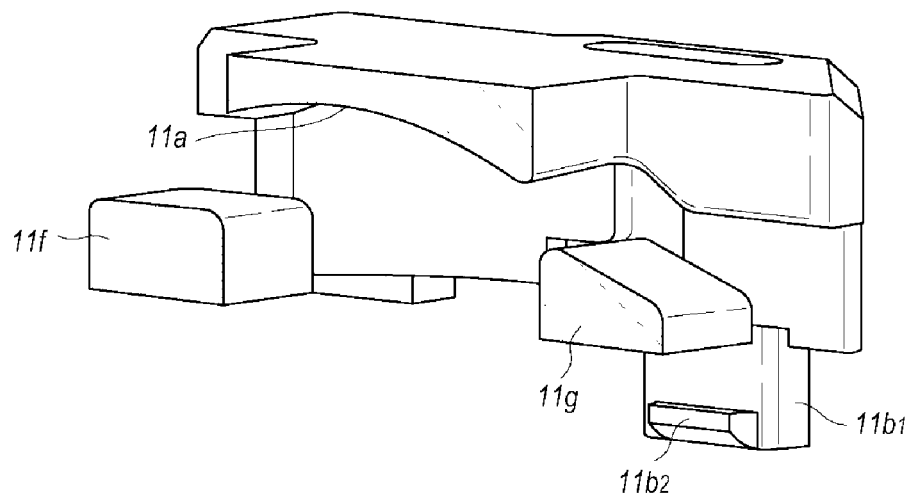
FIG. 10A is a perspective drawing of a fiber tray viewed from a side thereof, where a part of the fiber tray is cut to show an inside thereof.
Figure 10B:
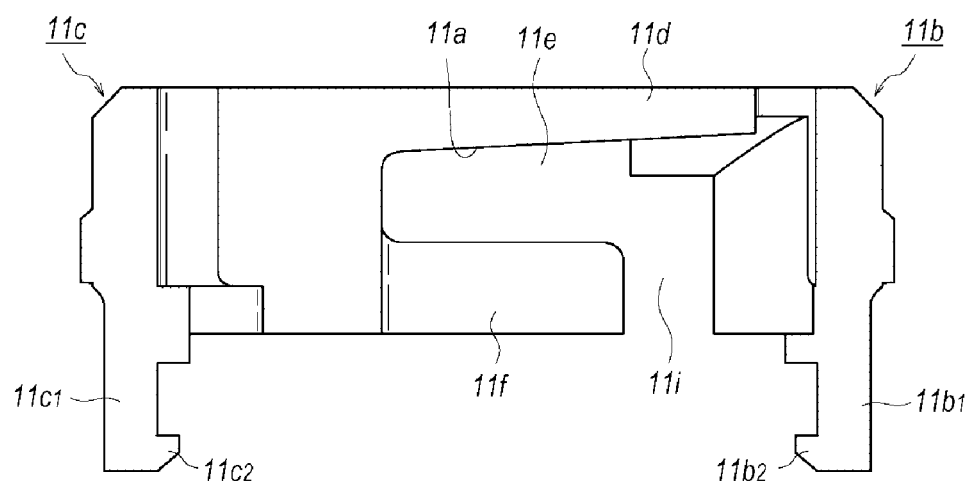
FIG. 10B shows a cross section of the fiber tray viewed from the back thereof.

FIG. 9A shows is an outer appearance of the fiber tray 11 viewed from the front, FIG. 9B is an outer appearance thereof viewed from the rear, FIG. 10A shows a side cross section, and FIG. 10B shows a rear cross section of the fiber tray 11. The fiber tray 11, which may be made of resin, provides a first side wall 11b, a second side wall 11c, and a top wall 11d connecting the side walls, 11b and 11c. The second side wall 11c in a front end and a rear end thereof provides a front terrace 11f and a rear terrace 11g, respectively, each protruding toward the first side wall 11b. These two terraces, 11f and 11g, and the top wall 11d may form a window 11e extending from the front to the rear. The front terrace 11f and the rear terrace 11g also form respective guides, 11h and 11i, against the first side wall 11b. Although the window 11e has an area narrower than the MT connectors, 10a and 10b, the inner fibers 10c may be set within the window passing through the guides, 11h and 11i. The side walls, 11b and 11c, provide legs, 11b1 and 11c1, extending downward and the legs, 11b1 and 11c1, provide hooks, 11b2 and 11c2, that latch the back surface of the circuit board 2. Thus, the fiber tray 11 may be fixed to the circuit board 2.

Referring to FIG. 10A, the fiber tray 11 of the present embodiment provides, as described above, the inclined ceiling 11a with an arched cross section along the longitudinal direction of the optical transceiver 1. Moreover, viewed from the front, or the rear, the top wall 11d of the fiber tray 11 has thicknesses gradually reducing as closer to the guides, 11h and 11i, which may form the inclined ceiling 11a. Accordingly, the inner fibers 10c in the extra portions thereof may slide on the inclined ceiling 11a toward the side of the guides, 11h and 11i, even when the inner fibers 10c provide enough extra lengths.

The fiber tray 11 of the present embodiment thus described provides a space for securing the extra lengths of the inner fibers 10c and the space has the inclined ceiling 11a. Because the inner fibers 10c, or the fiber bundle 10 of the embodiment has an arrangement of the ribbon fiber or bundled in an array; the extra lengths thereof may bend or warp in a direction perpendicular to the ribbon plane or the arrayed plane. When the MT connector, 10a or 10b, is arranged such that the fiber bundle 10 extends up and down in the optical transceiver 1, the fiber tray 11 preferably provides an inner space for securing the inner fibers 10c with an inclined side wall. That is, at least one of the sides walls, 11b and 11c, preferably has an inner surface inclined along the vertical direction.

The present application claims the benefit of priority of Japanese Patent Application No. 2016-037806, filed on Feb. 29, 2016, which is incorporated herein by reference.

What is claimed is:

1. An optical transceiver that performs a full-duplex communication between transmitting channels and receiving channels, the optical transceiver comprising:
   a multiple-fiber push on (MPO) connector that receives an external optical connector, the external optical connector optically coupling with a first mechanically transferable (MT) connector within the MPO connector;
   a circuit board having a primary surface;
   a laser diode (LD) chip mounted on the primary surface;
   a photodiode (PD) chip mounted on the primary surface;
   a coupling part that optically couples the LD chip and the PD chip with a second MT connector, the coupling part being mounted on the primary surface;
   a fiber bundle that includes inner fibers, the first MT connector, and the second MT connector, the inner fibers optically coupling the first MT connector with the second MT connector, the inner fibers having a length between the first MT connector and the second MT connector, the length being longer than a distance between the first MT connector that is optically coupled with the external optical connector and the second MT connector that is optically coupled with the coupling part; and
   a fiber tray that houses the inner fibers therein warping in a direction perpendicular to the primary surface, the fiber tray being mounted on the primary surface between the MPO connector and the coupling part,
   wherein the fiber tray has an inner space that houses the inner fibers therein, the inner space having an inner wall inclined toward a direction perpendicular to a direction along which the inner fibers warp, the inner wall causing the inner fibers to slide along the inner wall toward the direction perpendicular to the direction along which the inner fibers warp in a case that the inner fibers touch the inner wall, the inner wall being unparallel with the primary surface.

2. The optical transceiver of claim 1,
   wherein the first and second MT connectors having a cross section wider than a cross section of the space in the fiber tray,
   wherein the inner space of the fiber tray has a first guide in an end facing the MPO connector and a second guide in another end facing the coupling part, the inner fibers being set by passing the first guide and the second guide.

3. The optical transceiver of claim 2,
   wherein the LD chip and the PD chip have optical axes thereof extending perpendicular to the primary surface of the circuit board,
   wherein the coupling part bends the optical axes of the LD chip and the PD chip by a right angle.

4. The optical transceiver of claim 1,
   wherein the fiber bundle includes twelve (12) inner fibers, four (4) of the inner fibers being optically coupled with the LD chip for an optical transmission and other four of the inner fibers being optically coupled with the PD chip for an optical reception, rest four of the inner fibers between the four of the inner fibers and the other four of the inner fibers being unused for the optical transmission and the optical reception.

5. The optical transceiver of claim 4,
   wherein the inner fibers within the first and second MT connectors are arranged in a plane parallel to the primary surface, and the inner fibers in a medial position between the first and second MT connectors are bent to a direction perpendicular to the primary surface.

6. An optical transceiver, comprising:
   a multiple-fiber push on (MPO) connector that receives an external optical connector;
   a circuit board having a primary surface;
   a coupling part for transmitting and receiving optical signals, the coupling part being mounted on the primary surface;
   an inner fiber that optically couples the external optical connector with the coupling part, the inner fiber having a length longer than a distance between the MPO connector and the coupling part; and
   a fiber tray having an inner space that houses the inner fiber therein warping in a direction perpendicular to the primary surface, the inner space having an inner wall inclined toward a direction perpendicular to a direction along which the inner fiber warps, the inner wall causing the inner fiber to slide along the inner wall toward the direction perpendicular to the direction along which the inner fiber warps in a case that the inner fiber touches the inner wall, the inner wall being unparallel with the primary surface.

7. The optical transceiver of claim 6,
   further including a circuit board having a primary surface,
   wherein the coupling part and the fiber tray are mounted on the primary surface,
   wherein the direction along which the inner wall of the fiber tray inclines are parallel to the primary surface of the circuit board.

8. The optical transceiver of claim 6,
   wherein the inner wall of the inner space has an arched cross section along the direction connecting the MPO connector to the coupling part.

9. The optical transceiver of claim 7,
   wherein the inner fiber provides MT connectors in respective ends thereof,
   wherein the fiber tray provides guides in respective ends thereof, and
   wherein the inner space of the fiber tray has a cross section smaller than a cross section of the MT connectors, the inner fiber being set within the inner space by passing through the guides.

* * * * *